US011258345B2

(12) United States Patent
Helle et al.

(10) Patent No.: US 11,258,345 B2
(45) Date of Patent: Feb. 22, 2022

(54) METHOD FOR OPERATING A PLURALITY OF CHOPPER CIRCUITS

(71) Applicant: VESTAS WIND SYSTEMS A/S, Aarhus N (DK)

(72) Inventors: Lars Helle, Suldrup (DK); Torsten Lund, Fredericia (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/956,462

(22) PCT Filed: Nov. 30, 2018

(86) PCT No.: PCT/DK2018/050316
§ 371 (c)(1),
(2) Date: Jun. 19, 2020

(87) PCT Pub. No.: WO2019/120402
PCT Pub. Date: Jun. 27, 2019

(65) Prior Publication Data
US 2020/0362823 A1 Nov. 19, 2020

(30) Foreign Application Priority Data
Dec. 19, 2017 (DK) .......................... PA 2017 70960

(51) Int. Cl.
*H02M 1/32* (2007.01)
*H02M 1/00* (2006.01)
(Continued)

(52) U.S. Cl.
CPC ........... *H02M 1/0054* (2021.05); *H02M 1/32* (2013.01); *H02M 5/458* (2013.01); *H02P 3/22* (2013.01);
(Continued)

(58) Field of Classification Search
CPC .... H02M 1/0054; H02M 1/0096; H02M 1/32; H02M 1/327; H02M 1/322; H02M 5/458;
(Continued)

(56) References Cited

U.S. PATENT DOCUMENTS 10,103,663 B1 * 10/2018 Wagoner ................... H02P 3/00
2006/0001397 A1 1/2006 Ahmad et al.
(Continued)

FOREIGN PATENT DOCUMENTS

CN 105391081 A * 3/2016
EP 2621070 A1 7/2013
(Continued)

OTHER PUBLICATIONS

Danish Patent and Trademark Office 1st technical examination of patent application PA201770960, dated May 17, 2018.
(Continued)

*Primary Examiner* — Kyle J Moody
*Assistant Examiner* — Jye-June Lee
(74) *Attorney, Agent, or Firm* — Patterson + Sheridan, LLP

(57) ABSTRACT

The present invention relates to a method for simultaneous operation of a plurality of chopper circuits of a wind turbine power converter, the method comprising the steps of operating a controllable switching member of a first chopper circuit in accordance with a first switching pattern, and operating a controllable switching member of a second chopper circuit in accordance with a second switching pattern, wherein the first switching pattern is different from the second switching pattern during a first time period. In order to reduce switching losses the first switching pattern may involve that the controllable switching member of the first chopper circuit is clamped during the first time period. Additional chopper circuits may be provided in parallel to
(Continued)

the first and second chopper circuits. The present invention further relates to a power dissipation chopper being operated in accordance with the before mentioned method.

10 Claims, 9 Drawing Sheets

(51) Int. Cl.
  *H02P 3/22* (2006.01)
  *H02M 5/458* (2006.01)
  *H02P 101/15* (2016.01)

(52) U.S. Cl.
  CPC ........ *H02J 2300/28* (2020.01); *H02M 5/4585* (2013.01); *H02P 2101/15* (2015.01)

(58) Field of Classification Search
  CPC ......... H02M 5/4585; H02M 5/44; H02P 3/22; H02P 2101/15; H02P 2101/03; H02P 2201/03; H02J 2300/28; H02J 3/381; Y02E 10/72; Y02E 10/76; Y02B 70/10
  See application file for complete search history.

(56) References Cited

U.S. PATENT DOCUMENTS

| | | | |
|---|---|---|---|
| 2009/0079193 A1* | 3/2009 | Nielsen | H02M 5/458 290/44 |
| 2009/0206606 A1* | 8/2009 | Jorgensen | H02P 9/04 290/44 |
| 2011/0057588 A1* | 3/2011 | Rineh | H02P 3/18 318/380 |
| 2013/0193933 A1* | 8/2013 | Andresen | H02J 3/381 322/23 |
| 2014/0070751 A1* | 3/2014 | Niwa | H02M 5/458 318/494 |

FOREIGN PATENT DOCUMENTS

| | | |
|---|---|---|
| EP | 1831987 B1 | 7/2017 |
| GB | 2118742 A | 11/1983 |
| WO | 2017108046 A1 | 6/2017 |

OTHER PUBLICATIONS

PCT Notification of Transmittal of the International Search Report and The Written Opinion of the International Searching Authority, or the Declaration for Application No. PCT/DK2018/050316 dated Feb. 28, 2019.
European Patent Office examination Report for Application No. 18 815 512.1-1201 dated Sep. 4, 2021.

* cited by examiner

METHOD FOR OPERATING A PLURALITY OF CHOPPER CIRCUITS

FIELD OF THE INVENTION

The present invention relates to a method for increasing the power dissipation capability of a DC-chopper of a wind turbine power converter. The present invention relates in particular to a method for lowering the switching losses of the controllable switches of a plurality of chopper circuits forming the DC-chopper. The present invention further relates to a DC-chopper being operated in accordance with the method of the present invention.

BACKGROUND OF THE INVENTION

In the event of failures on power transmission or distribution grids, where the grid voltage drops to voltage levels which may be only a fraction of the nominal operating voltage, the power transfer from for example wind turbine generators to the power grid cannot be maintained. Furthermore, in order to support the power grid when the grid voltage recovers, wind turbine generators are expected to ramp up the active power very fast.

One theoretical solution to the above requirement could be to pitch wind turbine generators out and in very fast during low-voltage ride through (LVRT) events. However, in order to avoid mechanical stress and in order to be able to recover power production immediately after voltage recovery, matching the power input and the power output by dissipating the deficit is the preferred solution from a practical point of view. The power dissipation is provided using a dump load resistor connected to a DC-link of a power converter. The amount of power to be dissipated is controlled through a chopper transistor. Depending on the required dump load capacity a plurality of chopper circuits each comprising a dump load resistor and a transistor may be connected in parallel. The transistor may be an insulated-gate bipolar transistor (IGBT), an integrated gate-commutated thyristor (IGCT), a gate turn-off thyristor (GTO) or another relevant power semiconductor switch. In following the term IGBT will be used as the general term for a transistor.

The typical way of controlling the chopper IGBTs would be to measure the DC-link voltage and compare the measured voltage with a reference voltage. An error (error signal) between reference voltage and the measured voltage (the DC-link voltage or the square of the DC-link voltage) may be used to adjust the duty cycle (turn-on time) of the chopper IGBTs. The error signal could be fed through any type of controller, e.g. a proportional controller (P) and/or a proportional-integral controller (PI), which would then adjust the duty cycle in order to stabilize the DC-link voltage at (or close to) its reference value.

The operation of chopper IGBTs is associated with power losses which consist of conducting losses and switching losses (turn-on loss and turn-off loss). Typically, the distribution of conducting losses and switching losses would be around 50%-50% depending on the chosen switching frequency.

As it will be demonstrated in relation to FIG. 4 conducting losses and in particular switching losses heat up an IGBT during operation. This heating may be the limiting factor in terms of the amount of power, and thereby energy, that can be dissipated in a chopper circuit. In fact, the temperature of an IGBT may increase up to 160-170° C. using conventional switching patterns. As a result, the power dissipation capability of a chopper circuit is significantly reduced.

It may be seen as an object of embodiments of the present invention to increase the power dissipation capability of a DC-chopper of a power converter.

It may be seen as a further object of embodiments of the present invention to increase the power dissipation capability of a DC-chopper of a power converter by lowering the switching losses of a plurality of controllable switches.

The principle underlying the present invention is applicable in all chopper applications having a plurality of chopper circuits arranged in parallel.

DESCRIPTION OF THE INVENTION

The above-mentioned objects are complied with by providing, in a first aspect, a method for simultaneous operation of a plurality of chopper circuits of a wind turbine power converter, the method comprising the steps of
 operating a controllable switching member of a first chopper circuit in accordance with a first switching pattern, and
 operating a controllable switching member of a second chopper circuit in accordance with a second switching pattern,
wherein the first switching pattern is different from the second switching pattern during a first time period, and wherein the first switching pattern involves that the controllable switching member of the first chopper circuit is clamped during the first time period.

The method of the present invention is advantageous in that the first switching pattern is different from the second switching pattern whereby in particular the switching losses of controllable switching members may be significantly reduced. As a consequence the total power dissipation capability of the plurality of chopper circuits may be increased accordingly.

In the present context the first switching pattern may be different from the second switching pattern in various ways. For example, the first and second switching patterns may be phase shifted relative to each other so that, at a given point in time, the controllable switching member of a first chopper circuit is operated in accordance with the first switching pattern, and that the controllable switching member of a second chopper circuit, at the same time, is operated in accordance with the second and different switching pattern.

In an embodiment of the present invention the first switching pattern may thus involve that the controllable switching member of the first chopper circuit is clamped during the first time period. Clamping of the controllable switching member of the first chopper circuit may involve that this controllable switching member is either constantly on or off during the first time period.

Clamping a controllable switching member is generally advantageous in that in particular the switching losses of the clamped switching member decreases significantly as long as the switching member is clamped, i.e. during the first time period.

While the first switching pattern may involve clamping of the controllable switching member of the first chopper circuit, the second switching pattern may involve that a modulation pattern having a given switching frequency is applied to the controllable switching member of the second chopper circuit during the first time period.

Generally, the first time period may be significantly longer than the switching period of the switching frequency applied to the controllable switching member of the second chopper circuit. Thus, the switching frequency applied to the controllable switching member of the second chopper circuit may have a switching period being at least 10 times shorter than the first time period, such as 15 times shorter than the first time period, such as 20 times shorter than the first time period.

After the first time period the scenario may be reversed so that during a second time period immediately following the first time period, the second switching pattern may involve that the controllable switching member of the second chopper circuit is clamped. Again, clamping of the controllable switching member of the second chopper circuit may involve that this controllable switching member is either constantly on or off during the second time period. In this way the switching losses associated with the controllable switching member of the second chopper circuit may be reduced.

While the second switching pattern may involve clamping of the controllable switching member of the second chopper circuit, the first switching pattern may involve that a modulation pattern having a given switching frequency is applied to the controllable switching member of the first chopper circuit during the second time period. Similar to the situation during the first time period the switching frequency applied to the controllable switching member of the first chopper circuit may have a switching period being at least 10 times shorter than the second time period, such as 15 times shorter than the second time period, such as 20 times shorter than the second time period.

To summarize the above the controllable switching member of the first chopper circuit may be clamped during the first time period, whereas the controllable switching member of the second chopper circuit may be clamped during the second time period. As addressed above clamping of a controllable switching member reduces the switching losses of the switching member being clamped.

It should be noted that the method according to the present invention is also applicable to arrangements having additional controllable switching members of additional chopper circuits, such as third, fourth, fifth, sixth and even more chopper circuits. The first, second and additional chopper circuits may be coupled in parallel. It should also be noted that more than one switching member may be clamped at the same time.

Returning to the situation involving a first and a second chopper circuit the second time period may be triggered in response to a measured temperature of the controllable switching member of the second chopper circuit. Thus, while the controllable switching member of the first chopper circuit may be clamped in order to reduce switching losses, the temperature of the controllable switching member of the second chopper circuit is monitored. Then the temperature has reached a predefined value, the second time period may be initiated and as a consequence controllable switching member of the second chopper circuit may be clamped.

In a second aspect, the present invention relates to a power dissipation chopper assembly for a wind turbine power converter, the power dissipation chopper comprising a first chopper circuit comprising a power dissipation member and controllable switching member configured to be operated in accordance with a first switching pattern, a second chopper circuit comprising a power dissipation member and controllable switching member configured to be operated in accordance with a second switching pattern, and a control unit configured for simultaneous operation of the controllable switching members in accordance with the first and second switching patterns, wherein the first switching pattern is different from the second switching pattern during a first time period, and wherein the first switching pattern involves that the controllable switching member of the first chopper circuit is clamped during the first time period.

The above-mentioned definitions of for example switching patterns also apply in relation to the second aspect. It should also be noted that additional controllable switching members of additional chopper circuits, such as third, fourth, fifth, sixth and even more chopper circuits, may be provided. The first, second and additional chopper circuits may be coupled in parallel.

The first switching pattern may involve that the controllable switching member of the first chopper circuit is either constantly on or off during the first time period. The second switching pattern may involve that a modulation pattern having a given switching frequency may be applied to the controllable switching member of the second chopper circuit during the first time period. The first time period may be significantly longer than the switching period of the switching frequency applied to the controllable switching member of the second chopper circuit. Thus, the switching frequency applied to the controllable switching member of the second chopper circuit may have a switching period being at least 10 times shorter than the first time period, such as 15 times shorter than the first time period, such as 20 times shorter than the first time period.

The second switching pattern may involve that the controllable switching member of the second chopper circuit is either constantly on or off during a second time period that immediately follows the first time period. During this second time period the first switching pattern may involve that a modulation pattern having a given switching frequency may be applied to the controllable switching member of the first chopper circuit. Again, the second time period may be significantly longer than the switching period of the switching frequency applied to the controllable switching member of the first chopper circuit. Thus, the switching frequency applied to the controllable switching member of the first chopper circuit may have a switching period being at least 10 times shorter than the second time period, such as 15 times shorter than the second time period, such as 20 times shorter than the second time period. The second time period may be triggered in response to a measured temperature of the controllable switching member of the second chopper circuit.

In a third aspect the present invention relates to a wind turbine power converter comprising a power dissipation chopper assembly according to the second aspect, said chopper assembly being connected to a DC-link between a rectifier and an inverter of the wind turbine power converter.

BRIEF DESCRIPTION OF THE DRAWINGS

The present invention will now be described in further details with reference to the accompanying figures, wherein.

Figure 1:
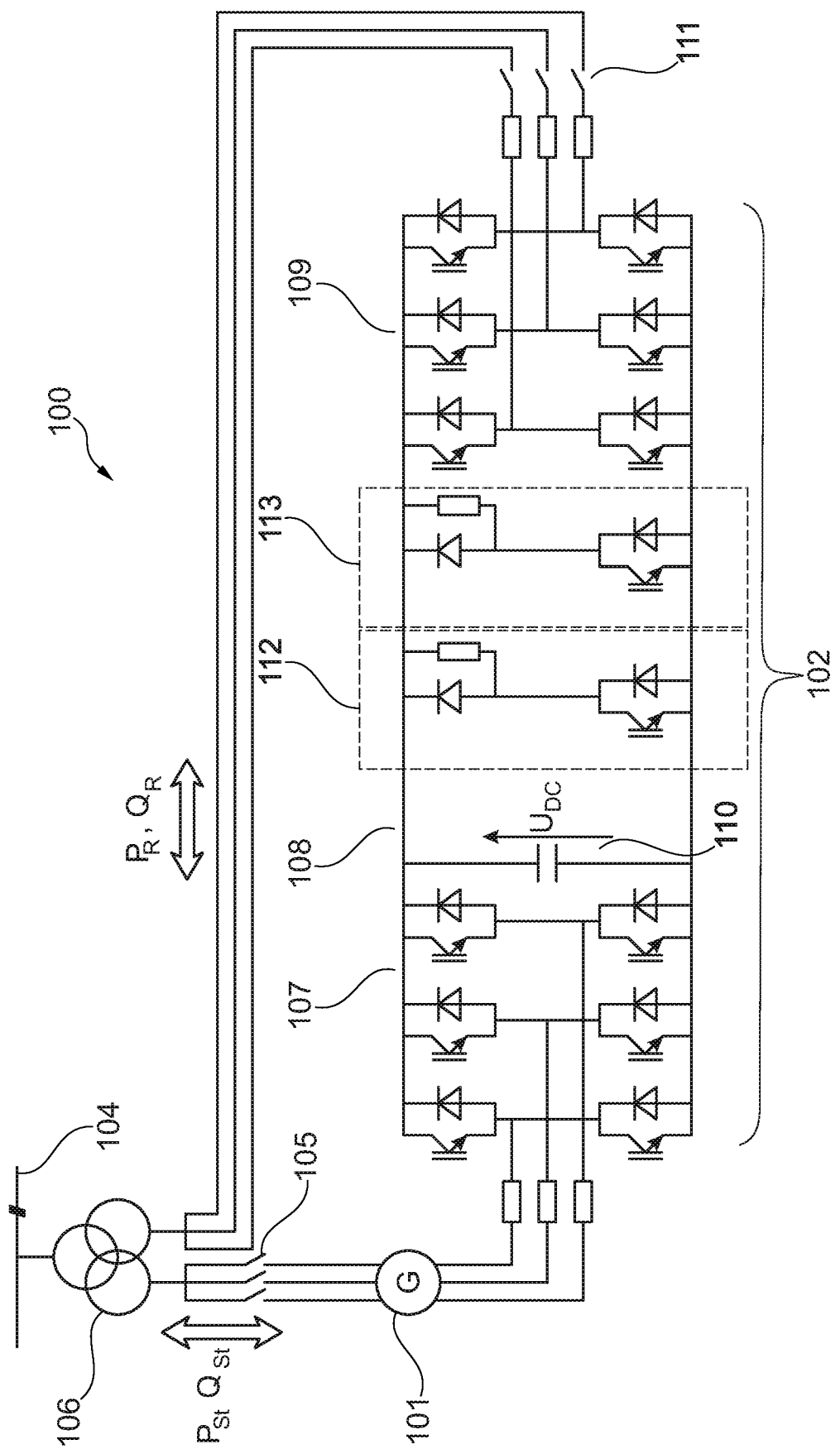
FIG. 1 shows a DFIG wind turbine generator.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a method for increasing the power dissipation capability of a DC-chopper of a power converter by lowering the switching losses of a plurality of controllable switches of a plurality of chopper circuits. The controllable switches would normally be transistors, such as IGBTs. The method according to the present invention finds its primary use in relation to power converters, such as power converters used in relation to wind power plants or wind turbine generators.

FIG. 1 illustrates a variable speed wind turbine generator 100 comprising a doubly fed induction generator (DFIG) 101 and a power/frequency converter 102 connected to the rotor of the generator 101. The generator 101 comprises a stator 103 connected to the utility grid 104 through disconnection switches 105 and the three-phase transformer 106. The generator 101 may supply active stator power, $P_{St}$, reactive stator power, $Q_{St}$, directly to the utility grid 104, or alternative receive power from the utility grid 104.

The rotor of the generator 101 is mechanically driven by a wind turbine rotor (not shown) through a low speed shaft, gearing means and s high speed shaft (not shown). Furthermore, the rotor is electrically connected to the power/frequency converter 102. The power/frequency converter 102 may convert a variable AC voltage to an intermediate DC voltage and subsequently to a fixed AC voltage having a fixed frequency.

The power/frequency converter 102 includes a rotor-side converter circuit 107 to rectify the AC voltage of the generator 101 to a DC voltage at the DC-link 108 or to invert the DC voltage to an AC voltage to be supplied to the rotor of the generator 101. The DC-link 108 smoothen the DC voltage over a DC-link capacitor 110. The grid-side converter circuit 109 inverts the DC voltage to an AC voltage with a preferred frequency or vice versa.

The active rotor power, $P_R$, and reactive rotor power, $Q_R$, are coupled to or from the utility grid 104 via the transformer 106 and the disconnection switches 111. Thus, wind turbine generator may be controlled to supply electric power from the generator to the utility grid with a constant voltage and frequency regardless of changing wind and wind turbine rotor speeds.

The DC-link 108 further comprises at least two chopper circuits 112, 113 connected between the two bus bars of the DC-link. Each chopper circuit 112, 113 is connected in parallel with the DC-link capacitor 110 and comprises at least a resistor and a controllable power switch connected in series. Moreover, each chopper circuit also comprises an anti-parallel diode for the resistor and an anti-parallel diode for the controllable power switch. The controllable power switch may be turned on and off in order to direct a current through the resistor and hereby dissipating power in the resistor. The DC-link voltage $U_{DC}$ may be lowered as charges are removed from the DC-link capacitor 110 by directing current through a resistor of one of the chopper circuits. Consequently, power generated by the generator 101 may be dissipated by activating one or more chopper circuits 112, 113 in time periods where it not possible to direct some or all the generated power to the utility grid 104.

The disconnection switches 105, 111 of the stator and the rotor facilitate that the generator 101 may be disconnected from the utility grid 104 in connection with for example maintenance work on the wind turbine generator or an islanding situation in the utility grid 104. Furthermore, the wind turbine generator may be disconnected the utility grid 104 if a grid failure involving a significant voltage drop persists over a longer time period.

Although the above description relates to a DFIG configuration it should be noted that the present invention is also applicable to other wind turbine generator configurations, such as for example full scale configurations where all the generated power is delivered to the utility grid through a power converter connected to the stator of the generator.

Figure 2:
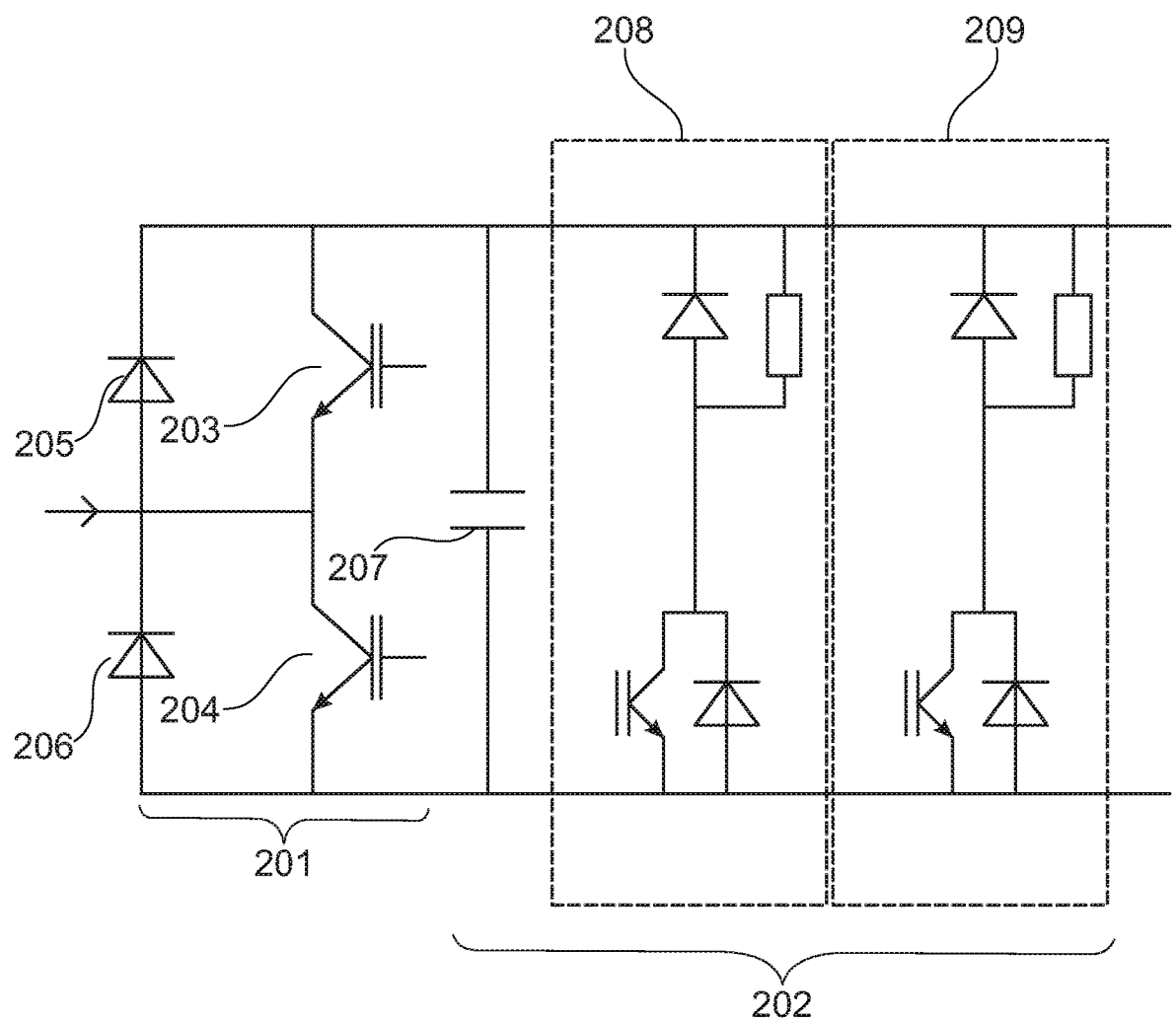
FIG. 2 shows a converter branch and a converter DC-link including a plurality of parallel coupled chopper circuits.

FIG. 2 shows a branch/phase of the rotor-side converter 201 and the DC-link 202. The branch corresponds to one of the phases in a three-phase Pulse Width Modulation (PWM) frequency converter and includes two power switches, such as IGBTs 203, 204 with associated anti-parallel diodes 205, 206. The DC-link capacitor 207 and the two chopper circuits 208, 209 are connected to the positive and negative bus bars of the DC-link. It should be noted that additional chopper circuits may be provided so that the total number of chopper circuits exceeds two. Moreover, FIG. 2 schematically illustrates how power may be dissipated in the resistors of the chopper circuits 208, 209 and hereby lower the DC-link voltage. The controllable switches of the chopper circuits 208, 209 are controlled in such a way that power may be dissipated in the resistors in accordance with the switching pattern of the present invention as it will be explained further below.

As addressed above operating the controllable switch, such as an IGBT, of a chopper circuit of the type shown in FIGS. 1 and 2 is associated with a power loss which consists of conducting losses and switching losses (turn-on loss and turn-off loss). Typical distribution of conducting losses and switching losses is around 50%-50% depending on the chosen switching frequency. The switching losses may in particular play a crucial role as the turn-on losses depend on the current flowing due to the inductive part of the chopper resistor. When turning off the IGBT, the current through the transistor drops to zero, but due to the inductive part of the chopper resistor, the current through the resistor cannot abruptly go to zero. Instead it commutates to the freewheeling diode and decline according to the time constant of the R/L circuit.

Figure 3:
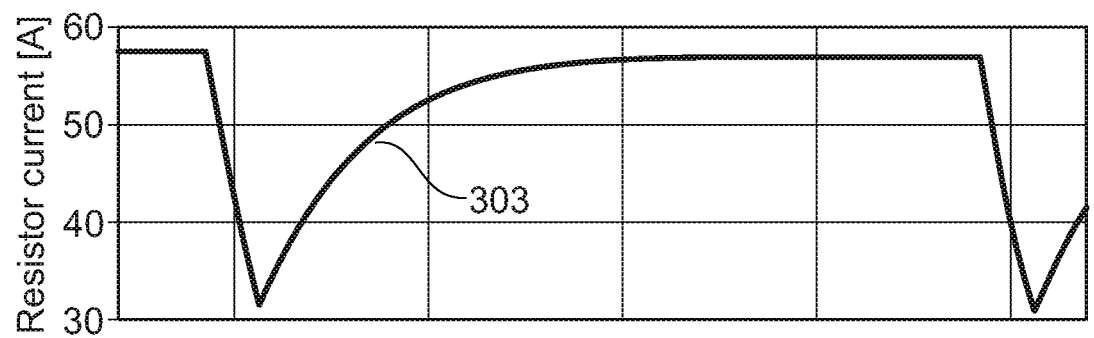
FIG. 3 shows diode, transistor and resistor currents of a typical prior art system, FIG. 4 show the transistor temperature of a typical prior art system.
Figure 3:
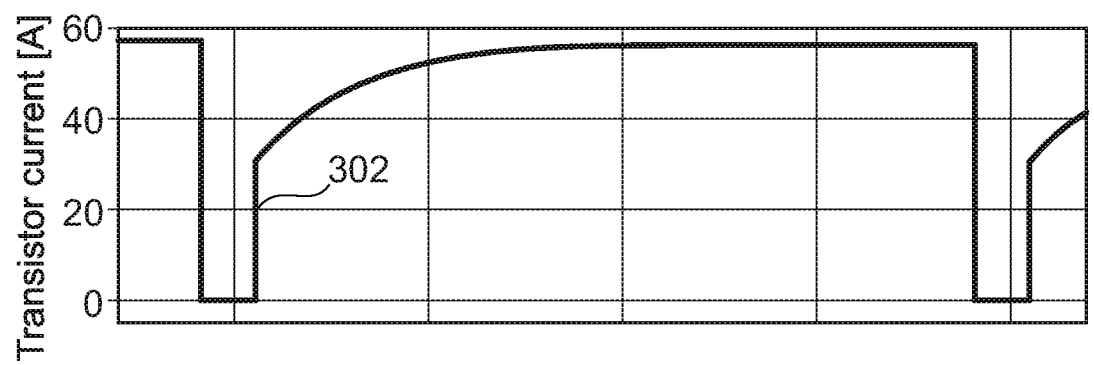
Figure 3:
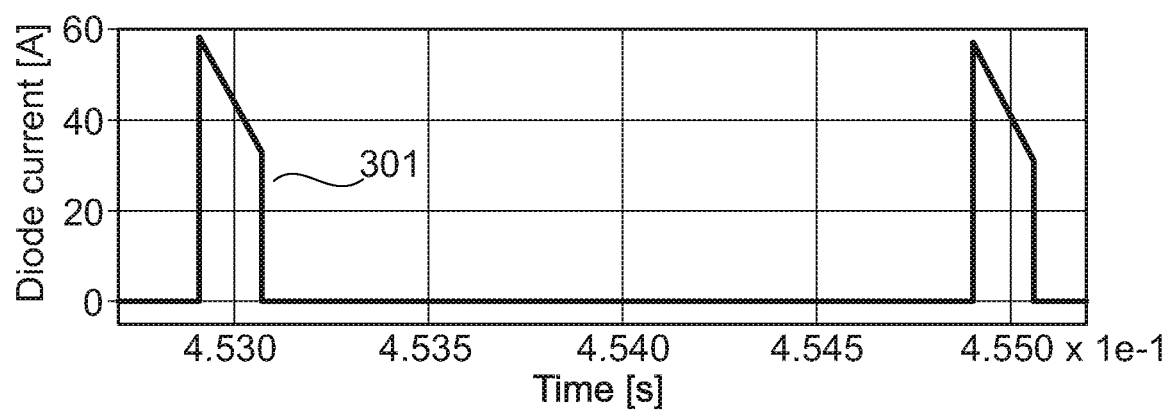

For high chopper loads, the duty cycle applied to the IGBT is close to 1 which means that the IGBT turn on immediately after turn-off. In this case the chopper resistor current may typically not have reached zero, and hence the transistor turns on with a freewheeling diode current still flowing which thereby commutates to the IGBT. This is associated with turn-on switching losses. FIG. 3 illustrates the typical current transitions in a chopper circuit, i.e. the freewheeling diode current 301, the IGBT current 302 and the resistor current 303. Moreover, in order provide an accurate control very small duty cycles are not desirable either because the turn-on times and the rise times are difficult to compensate for.

Figure 4:
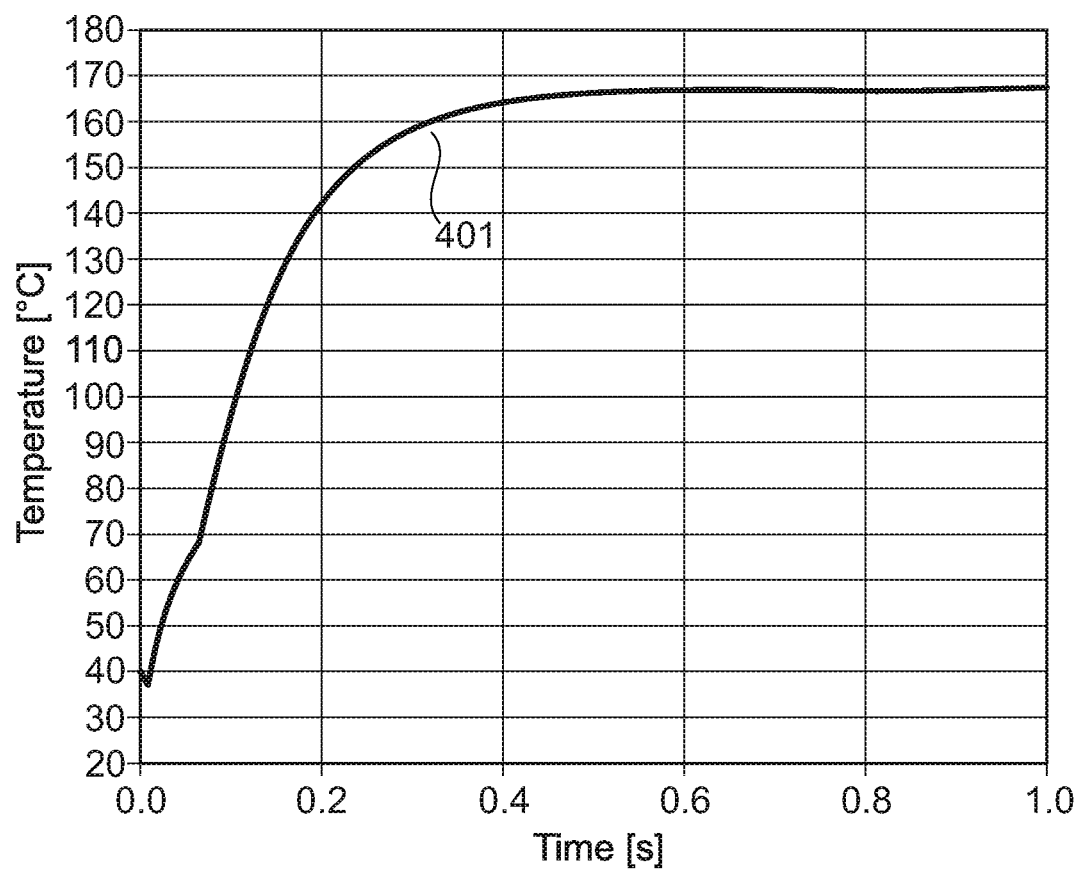

The conducting losses and switching losses heat up the IGBT during operation. This heating may be the limiting factor in terms of the amount of power, and thereby energy, what can be dissipated in a chopper circuit. FIG. 4 illustrates the temperature of an IGBT during typical operation thereof. As seen in FIG. 4 the IGBT temperature curve 401 reaches a temperature above 160° C. in less than 500 ms. Thus, the temperature increase of the IGBT is thus around 120° C.

According to the present invention new switching patterns are proposed in order to lower in particular the switching losses in applications where a plurality of chopper circuits are operated in parallel. More specifically, it is proposed to clamp the IGBT of at least one chopper circuit to be constantly either on or off for a certain time period, said certain time period being significantly longer than the switching period. The IGBT of the remaining chopper circuit or circuits may be operated with a given duty cycle which may be either lowered or increased in order to give the same equivalent duty cycle and thereby the same overall power dissipation compared to the scenario where none of the IGBTs Is/are clamped. After the certain period, the IGBT of one or more other chopper circuits may be clamped.

Figure 5A:
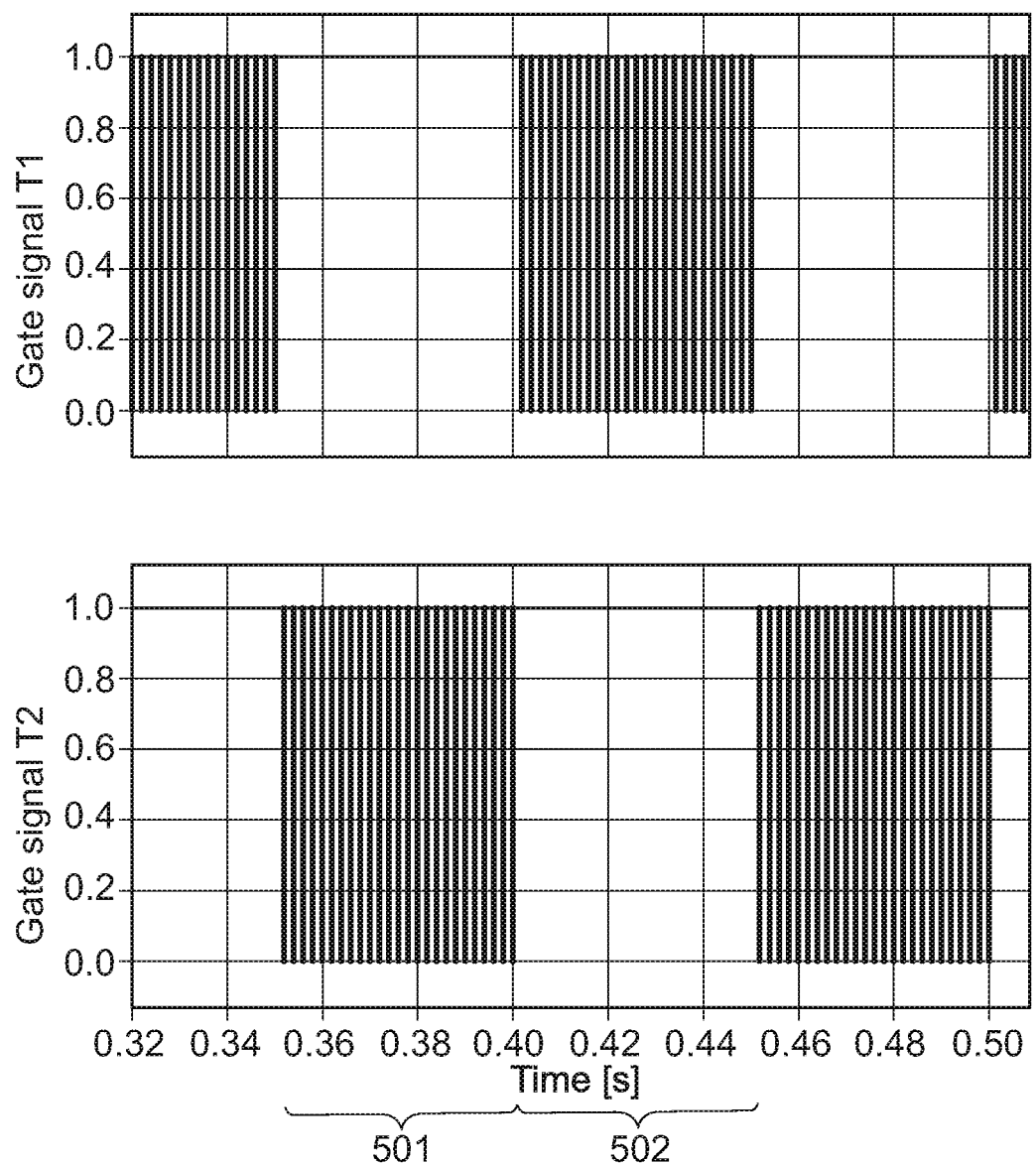
FIG. 5 shows the switching patterns of the present invention.
Figure 5B:
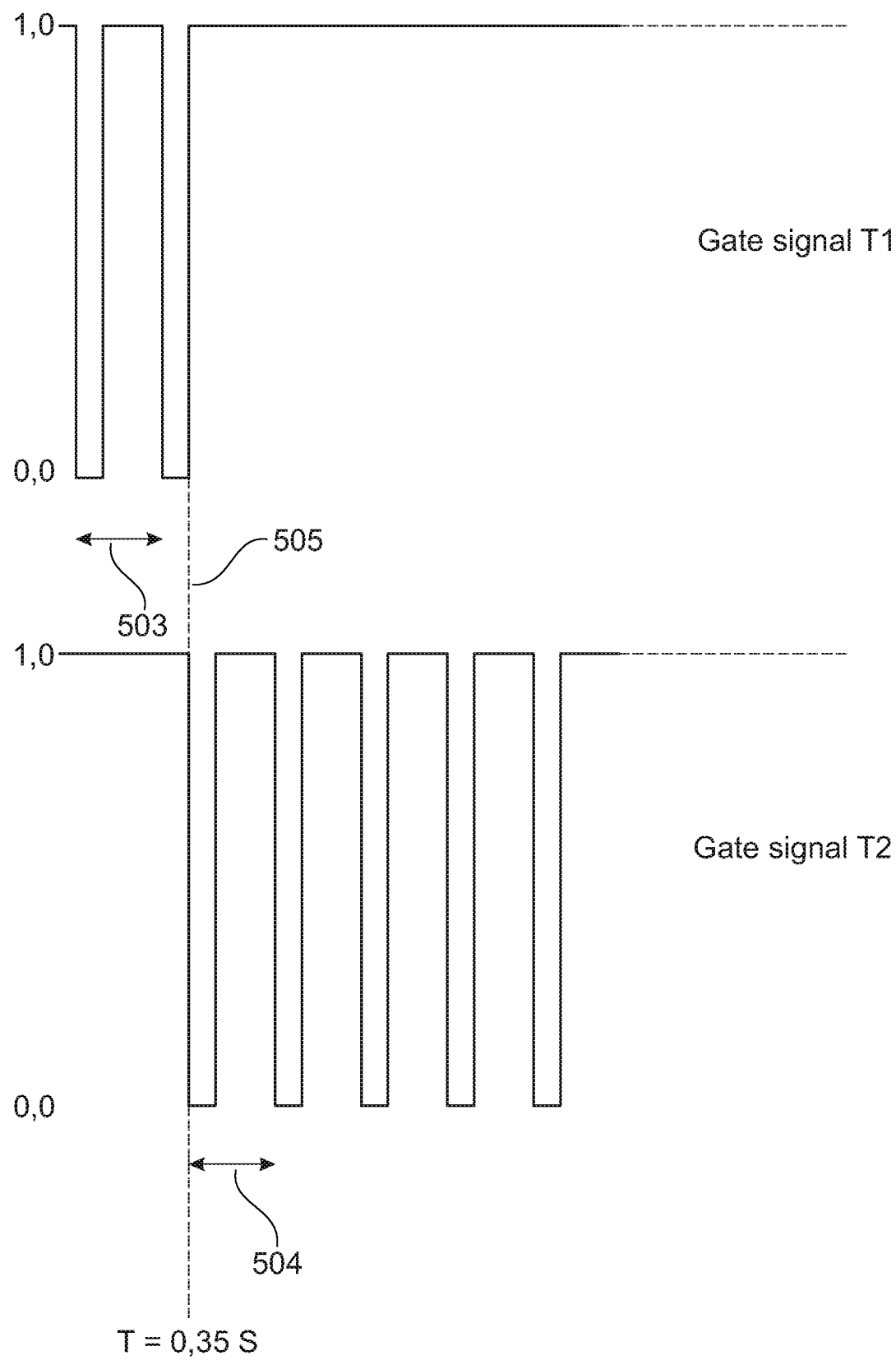

An example involving two chopper circuits and thereby two IGBTs is depicted in FIG. 5a, where the upper graph shows the gate signal, T1, applied to the first IGBT, while the lower graph shows the gate signal, T2, applied to the second IGBT. As seen FIG. 1 the first IGBT is clamp to 1 during the clamping time period 501, while the second IGBT is operated with a certain switching period and a certain duty cycle. When the time reaches 400 ms the switching pattern is reversed in that the second IGBT is clamped to 1 during the clamping time period 502, while the first IGBT is operated with a certain switching period and a certain duty cycle. As depicted in FIG. 5 the applied switching period is significantly shorter than the respective time periods 501, 502. The switching pattern is also altered at 350 ms, 450 ms and 500 ms. Thus, the clamping time periods 501, 502 depicted in FIG. 5a are around 50 ms. The switching period is around 2 ms and the duty cycle is around 66%, cf. FIG. 5b.

FIG. 5b is a close-up of FIG. 5a around T=0.35 s where the upper graph shows the gate signal, T1 applied to the first IGBT, while the lower graph shows the gate signal, T2, applied to the second IGBT. The dashed line 505 at T=0.35 is the point in time where the second IGBT becomes unclamped and the first IGBT becomes clamped. As addressed above the switching period 503, 504 is around 2 ms and the duty cycle is around 66%.

It should be noted that both the clamping time periods 501, 502 and the switching periods 503, 504 could deviate from these values. Also, the clamping time period 501, 502 may not necessarily have the same length. The duty cycle may obviously vary over time and may thus differ from 66%.

The lack of switching of one IGBT around half of the time reduces the IGBT-related losses with around 25% assuming the before-mentioned 50%-50% split between conduction losses and switching losses. Moreover, since the duty cycle of the IBGT being switched is reduced, the duration between turn-off and turn-on is increased compared to a traditional switching strategy. As a result, the inductive current running in the diode in the off time will have more time to decline whereby the current level in the diode at turn-on is lower. This lower current level in the diode at turn-on further reduces the switching losses.

Figure 6:
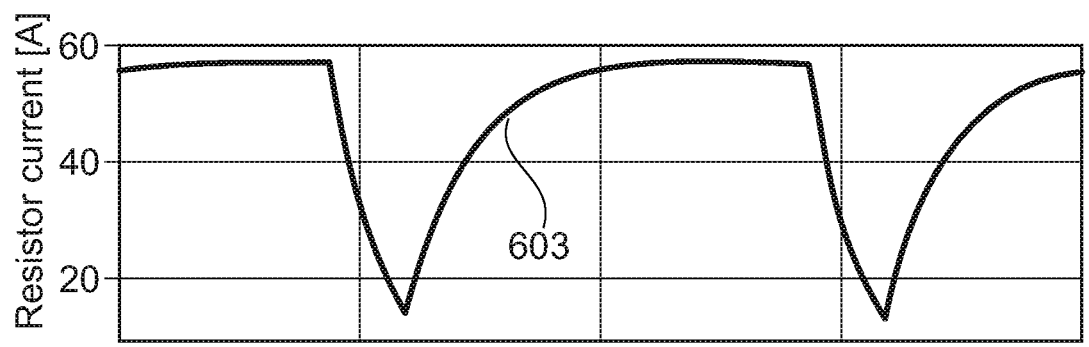
FIG. 6 shows diode, transistor and resistor currents of a system using the switching patterns of the present invention, FIG. 7 show the transistor temperature of a system using the switching patterns of the present invention.
Figure 6:
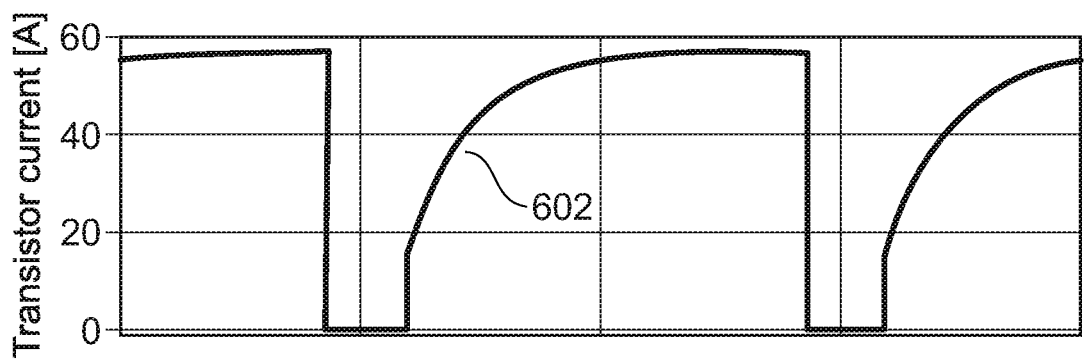
Figure 6:
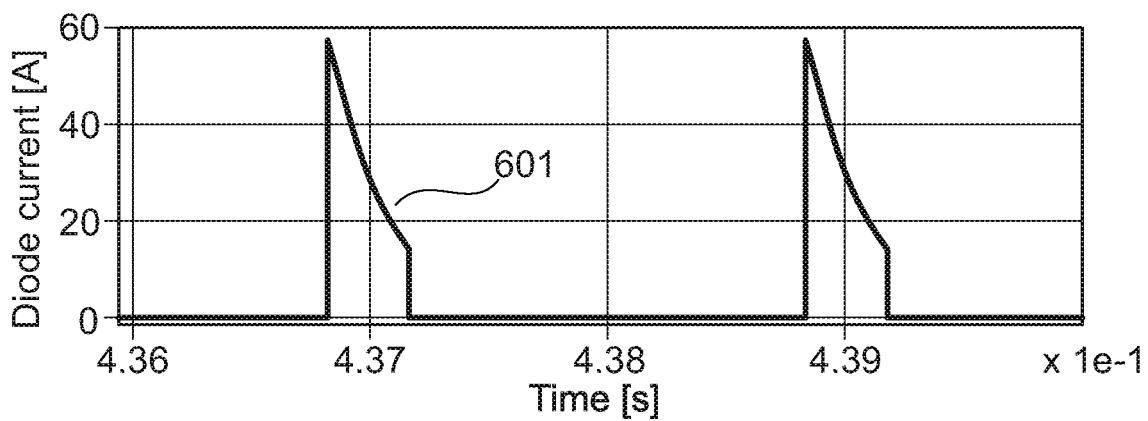

FIG. 6 illustrates the current transitions in the chopper circuit when the new switching pattern is applied, i.e. the freewheeling diode current 601, the IGBT current 602 and the resistor current 603.

Figure 7:
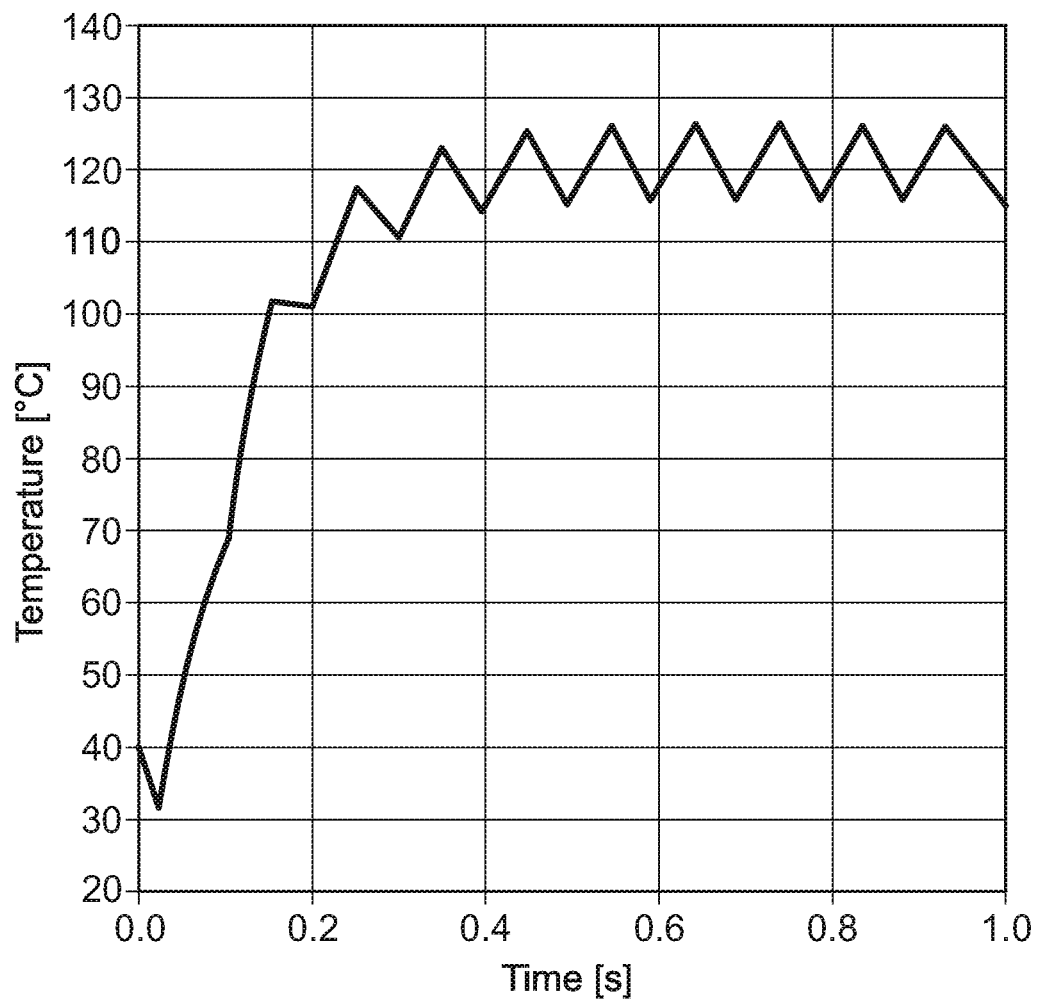

Applying the new switching pattern in the same chopper circuits and under the same conditions as describe in relation to FIGS. 3 and 4 the temperature of the IGBT will be as shown in FIG. 7. Compared to FIG. 4 the temperature increase of the IGBT has been lowered from around 120° C. to 85° C. as a result of the new switching pattern.

The underlying principle of the present invention may be applied in various scenarios. As an example an IGBT could be clamped to zero instead of being operated with a very low duty cycle while the duty cycle of another IGBT is increased in order to compensate for the clamped (to zero) IGBT.

Even further, the clamping time period of an IGBT can be adjusted to be below the thermal time constant of the semi-conductor module to which the IGBT is thermally connected to ensure a smooth and controllable temperature profile over time. Thus, with this approach the appearances of temperature peaks and high temperature gradients are significantly reduced. In relation to temperature the IGBT having the highest temperature could be clamped for a period being longer compared to other IGBTs.

A more generic scheme could involve that clamping of IGBTs is only applied for very low and/or very high duty cycles. This would also imply that in case a duty cycle changes very rapidly, the state of a clamped IGBT should be changed accordingly and preferably immediately.

Figure 8:
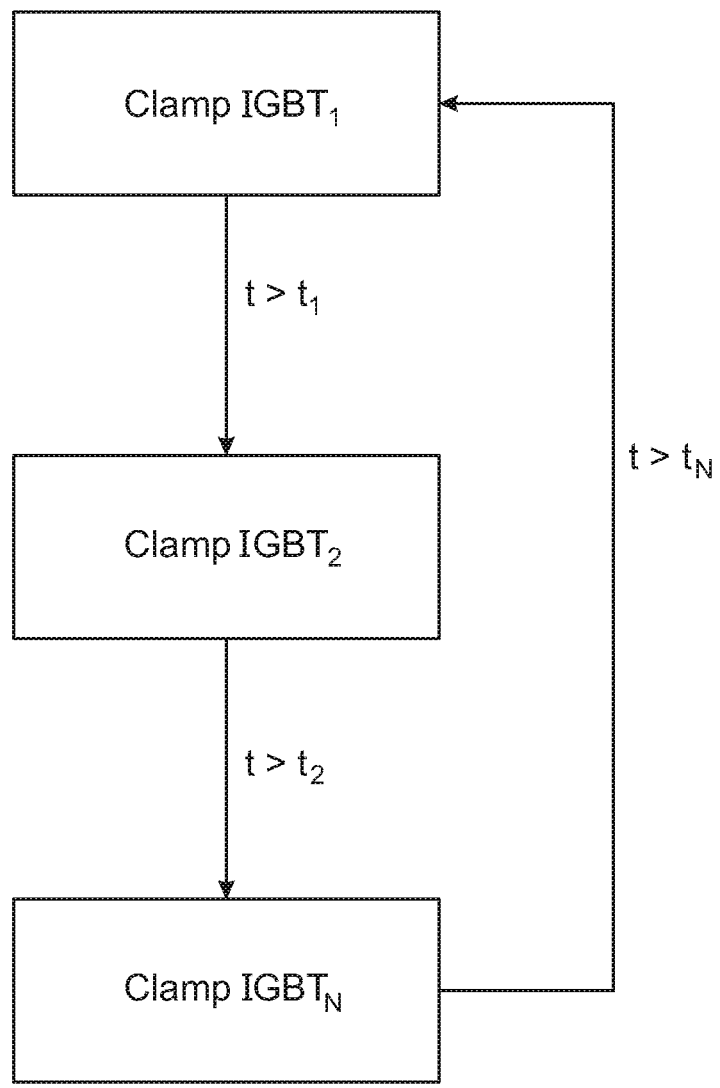
FIG. 8 shows a possible control strategy of the present invention.

FIG. 8 depicts one possible time-based control approach where a plurality of IGBTs ($IGBT_1$–$IGBT_N$) are clamped in accordance with a predefined time table. Thus, according to the control approach depicted in FIG. 8 $IGBT_1$ is clamped until a predefined time, $t_1$, at which time the $IGBT_1$ is unclamped and $IGBT_2$ is clamped instead. $IGBT_2$ remains clamped until a predefined time, $t_2$, at which time $IGBT_2$ is unclamped and $IGBT_N$ is clamped instead. This sequence of clamping/unclamping of IGBTs continuous as long as it is required. As addressed above the sequence of clamping/ unclamping of IGBTs could also rely on measured IGBT temperatures in that IGBT, may remain clamped until $IGBT_2$ reaches a predefined temperature, $T_2$, at which temperature $IGBT_2$ is clamped and IGBT, is unclamped. When IGBT, reaches a predefined temperature, $T_1$, IGBT, is clamped and $IGBT_2$ is unclamped. Additional IGBTs may be involved in the temperature-based sequence of clamping/unclamping.

The invention claimed is:

1. A method for simultaneous operation of a plurality of chopper circuits of a wind turbine power converter, the method comprising:
   operating a first controllable switching member of a first chopper circuit in accordance with a first switching pattern; and
   operating a second controllable switching member of a second chopper circuit in accordance with a second switching pattern;
   wherein the first switching pattern is different from the second switching pattern during a first time period,
   wherein the first switching pattern clamps the first controllable switching member of the first chopper circuit during the first time period;
   wherein the second switching pattern cycles the second controllable switching member of the second chopper circuit between an on state and an off state according to a modulation pattern of a given switching frequency; and wherein clamping sets the first controllable switching member to be one of on or off while the second chopper circuit is in the on state and to remain set to the one of on or off while the second chopper circuit is in the off state as the second chopper circuit cycles according to the modulation pattern during the first time period.

2. The method of claim 1 wherein the given switching frequency has a switching period at least ten times shorter than the first time period to cycle the second controllable switching member at least five times during the first time period.

3. The method of claim 2, wherein, during a second time period immediately following the first time period, the second switching pattern clamps the second controllable switching member of the second chopper circuit.

4. The method of claim 3, wherein clamping of the second controllable switching member of the second chopper circuit involves that the second controllable switching member of the second chopper circuit is either constantly on or off during the second time period.

5. The method of claim 4, wherein the first switching pattern involves that the modulation pattern having the given switching frequency is applied to the first controllable switching member of the first chopper circuit during the second time period to cycle the first controllable switching member of the first chopper circuit between the on state and the off state according to the modulation pattern having the given switching frequency, and wherein clamping sets the second controllable switching member to be one of on or off while the first chopper circuit is in the on state and remain set to the one of on or off while the first chopper circuit is in the off state as the first chopper circuit cycles according to the modulation pattern during the second time period.

6. The method of claim 5, wherein the given switching frequency applied to the first controllable switching member of the first chopper circuit has a switching period at least ten times shorter than the second time period to cycle the first controllable switching member at least five times during the second time period.

7. The method of claim 3, wherein the second time period is triggered in response to a measured temperature of the second controllable switching member of the second chopper circuit satisfying a temperature threshold.

8. A power dissipation chopper assembly for a wind turbine power converter, the power dissipation chopper assembly comprising:
a first chopper circuit comprising a first power dissipation member and a first controllable switching member configured to be operated in accordance with a first switching pattern;
a second chopper circuit comprising a second power dissipation member and a second controllable switching member configured to be operated in accordance with a second switching pattern; and
a control unit configured for simultaneous operation of the first controllable switching member and the second controllable switching member in accordance with the first switching pattern and the second switching pattern, wherein the first switching pattern is different from the second switching pattern during a first time period,
wherein the second switching pattern cycles the second controllable switching member between an on state during a first portion of the first time period and an off state during a second portion of the first time period according to a modulation pattern of a given switching frequency, and
wherein the first switching pattern clamps the first controllable switching member to remain in one of the on state or the off state for both the first portion and the second portion of the first time period.

9. The power dissipation chopper assembly according to claim 8, wherein, during a second time period immediately following the first time period, the second switching pattern involves that the second controllable switching member is clamped to one of the on state or the off state for all of the second time period, and wherein the first switching pattern applies the modulation pattern having the given switching frequency to the first controllable switching member during the second time period to cycle the first controllable switching member between the on state and the off state according to the modulation pattern having the given switching frequency, and wherein the second time period is triggered in response to a measured temperature of the second controllable switching member of satisfying a temperature threshold.

10. A wind turbine power converter comprising a power dissipation chopper assembly connected to a DC-link between a rectifier and an inverter of the wind turbine power converter; the power dissipation chopper assembly, comprising:
a first chopper circuit comprising a first power dissipation member and a first controllable switching member configured to be operated in accordance with a first switching pattern;
a second chopper circuit comprising a second power dissipation member and a second controllable switching member configured to be operated in accordance with a second switching pattern; and
a control unit configured for simultaneous operation of the first controllable switching member and the second controllable switching member in accordance with the first switching pattern and the second switching pattern, wherein the first switching pattern is different from the second switching pattern during a first time period, wherein the first switching pattern clamps the first controllable switching member during the first time period to one of an on state and an off state, and wherein the second switching pattern cycles the second controllable switching member between the on state and the off state during the first time period according to a modulation pattern of a given switching frequency while the first controllable switching member is clamped to remain in the one of the on state and the off state.

* * * * *